United States Patent [19]
Goodman

[11] Patent Number: 5,999,929
[45] Date of Patent: Dec. 7, 1999

[54] WORLD WIDE WEB LINK REFERRAL SYSTEM AND METHOD FOR GENERATING AND PROVIDING RELATED LINKS FOR LINKS IDENTIFIED IN WEB PAGES

[75] Inventor: Marc I. Goodman, Waltham, Mass.

[73] Assignee: Continuum Software, Inc, Woburn, Mass.

[21] Appl. No.: 08/940,085

[22] Filed: Sep. 29, 1997

[51] Int. Cl.[6] .................................................... G06F 17/30
[52] U.S. Cl. ................................ 707/7; 707/10; 707/104
[58] Field of Search ................................ 707/7, 103, 10, 707/104

[56] References Cited

U.S. PATENT DOCUMENTS

| | | | |
|---|---|---|---|
| 5,530,852 | 6/1996 | Meske, Jr. et al. | 707/10 |
| 5,572,643 | 11/1996 | Judson | 395/793 |
| 5,600,831 | 2/1997 | Levy et al. | 707/2 |
| 5,623,652 | 4/1997 | Vora et al. | 707/10 |
| 5,625,781 | 4/1997 | Cline et al. | 395/335 |
| 5,678,041 | 10/1997 | Baker et al. | 707/10 |
| 5,764,906 | 6/1998 | Edelstein et al. | 395/200.49 |
| 5,768,578 | 6/1998 | Kirk et al. | 707/100 |
| 5,784,564 | 7/1998 | Camaisa et al. | 395/200.54 |

*Primary Examiner*—Thomas G. Black
*Assistant Examiner*—Frantz Coby
*Attorney, Agent, or Firm*—Richard A. Jordan

[57] ABSTRACT

A link referral system includes a classification arrangement for classifying Web pages that the system retrieves over the World Wide Web. In assigning a link in a Web page to a particular classification, the classification arrangement originally establishes the classification using the name for the particular section of the Web page in which the link is located. Using statistical analysis of the occurrence of related links within sections of a number of diverse Web pages, some of which are named sections, the system creates classifications of links under both named classifications as well as anonymous classifications of links that co-occur with a high degree of probability. To minimize errors in the statistical analysis, the classification arrangement determines whether different World Wide Web addresses (so-called "URL's") which are used to access the Web pages in fact identify the same Web page. The classification information is used to supplement Web pages retrieved by a client through the link referral system to indicate the availability of related link information from the link referral system. In addition, the link referral system can provide related link information to the client in response to requests, identifying particular links or classifications, from the client.

9 Claims, 2 Drawing Sheets

WORLD WIDE WEB LINK REFERRAL SYSTEM AND METHOD FOR GENERATING AND PROVIDING RELATED LINKS FOR LINKS IDENTIFIED IN WEB PAGES

FIELD OF THE INVENTION

The invention is generally related to digital computer systems and methods, and more particularly to systems and methods for providing supplemental information in World Wide Web pages retrieved by a user over, for example, the Internet. The invention particularly provides, for links in Web pages that are retrieved by a user over the Internet, related link information regarding other links that are related, by subject matter, to respective ones of the links in the retrieved web pages. The invention provides for display or indication of the availability of related link information in the respective Web page which contains the original links, and/or in windows separate and apart from the window(s) in which the respective Web page(s) are displayed. The invention further provides for the display, alternatively and/or in addition, of the display or indication of the availability of related link information for particular subject matter or for particular links separate and apart from the display of any Web pages.

BACKGROUND OF THE INVENTION

The World Wide Web, together with other resources available over the Internet, provide a mechanism by which users, using computers or other information access devices, can obtain large amounts of information about a wide variety of subjects from a large number of information providers. Generally, information provided by information providers is in the form of "Web pages," generally in HTML (HyperText mark-up language) format, which is a text-based format that describes how the respective Web page is to be displayed by the user's computer, and provides textual information, typically in ASCII form, and graphical information generally in a compressed format such as "GIF" or "JPEG." In addition, a Web page will typically have HyperText-like "links" to other Web pages which may be provided by the same provider as the one Web page, as well as other Web pages which may be provided by other information providers. Typically, the links to Web pages provided by other information providers will be those links which the provider of the one Web page knows about when the one Web page is originally generated or updated, and will likely not be an exhaustive and updated set of Web pages which may be available over the World Wide Web related thereto.

SUMMARY OF THE INVENTION

The invention provides a new and improved system and method for providing link information identifying links which are related to particular types of subject matter or which are related, by subject matter, to other links, including, for example, links in Web pages that are retrieved by a user over the Internet.

In brief summary, the World Wide Web link referral system constructed in accordance with the invention includes a classification arrangement for classifying Web pages that the system retrieves over the World Wide Web. In assigning a link in a Web page to a particular classification, the classification arrangement originally establishes the classification using the name for the particular section of the Web page in which the link is located. Using statistical analysis of classifications of links over a number of Web pages, the classification arrangement determines whether different section names used in diverse Web pages should be deemed synonymous and should relate to the same classification, and, if so, associates all of the links to the same classification. To minimize errors in the statistical analysis, the classification arrangement determines whether different World Wide Web addresses (so-called "URL's") which are used to access the Web pages in fact identify the same Web page.

Diverse embodiments of the World Wide Web link referral system use the classified link information in various ways. In one embodiment, a client, employing a World Wide Web browser, accesses a Web page by directing a request to the link referral system. The link referral system, in turn, retrieves the Web page, supplements or annotates it with indicia indicating the availability of link referral information for one or more respective links which are listed on the page, and provides the annotated Web page to the requesting client. An operator at the client can initiate a retrieval of the links which are classified with a particular link on the Web page by clicking on an annotation associated therewith. When the operator clicks on the annotation, the client will contact the link referral system, which, in turn, will return a Web page that includes the list of links which it has classified with the particular annotation clicked on. The client's browser can display the Web page and the operator can click on any of the related links displayed therein to enable the retrieval of Web pages identified thereby.

In another embodiment, the client is provided with a browser and also a link request daemon. In this embodiment, instead of issuing a retrieval request for a Web page to the link referral system, the browser will issue the retrieval request in the normal manner to the proprietor of the Web page. When the proprietor returns the Web page, the browser will display it to the operator. The daemon, either on its own or in response to input from the operator, will thereafter issue a related link request for particular links in the displayed Web page to the link referral system. The link referral system will, in turn, return links which it has classified with the particular links provided by the daemon, and the daemon will enable the client to display them (that is, the links returned by the link referral system) to the operator in a separate window. The operator can click on any of the related links returned by the link referral system to enable the retrieval of Web pages identified thereby.

In a further aspect, which can be used with either embodiment or separate and apart from either embodiment, the client, using a browser, can request from the link referral system Web pages that identify the classifications that it (that is, the link referral system) has developed. The operator, by clicking on a respective classification, can obtain a Web page that identifies the links that the link referral system has classified therein, and, by clicking on the links, can access the Web pages in a conventional manner.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
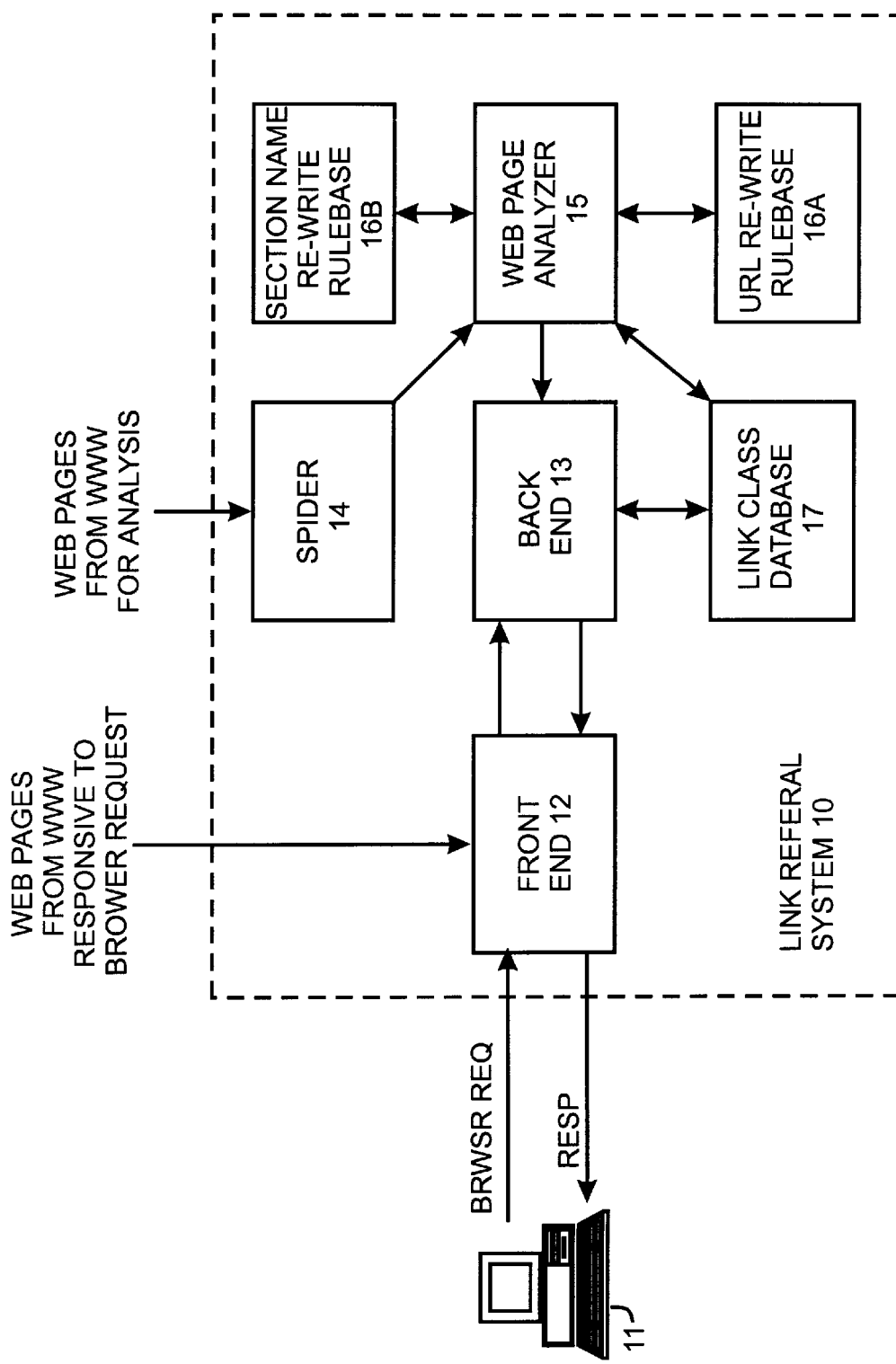
FIG. 1 is a functional block diagram of one embodiment of a World Wide Web link referral system constructed in accordance with the invention.

FIG. 1 is a functional block diagram of a World Wide Web link referral system 10 constructed in accordance with the invention. The link referral system 10 connects to a network, in one particular embodiment the Internet, to facilitate communications with client computers, such as client computer 11 and various server computers connected to the Internet, and performs several types of operations. In one type of operation, the link referral system 10 retrieves Web pages from the other computers, analyzes them to assign respective ones of the Web pages to one or more classes, and associates each Web page's URL (uniform resource locator) with the respective class(es) to which the respective Web page has been assigned.

In a second type of operation, the link referral system 10 also operates as a server computer to receive requests for Web pages from client computer 11. In response to a Web page request from the client computer 11 for a Web page that is available over the Internet, the link referral system 10 retrieves the requested Web page from the server computer (not shown) which maintains it, analyzes the retrieved Web page to determine it (that is, the retrieved Web page) contains one or more links to other Web pages which have been classified, and, for each such link supplements the respective link indicator(s) in the Web page with a respective link referral indicator, and provides the supplemented Web pages to the requesting client computer 11 for display to the operator in a conventional manner. In one particular embodiment, the link referral indicator will be displayed in the form of a pushbutton, and in that embodiment the link referral system 10 supplements the Web page so as to enable the client computer to display each respective link referral indicator pushbutton proximate the location at which the indicator for the link will be displayed when the supplemented Web page is displayed. For Web pages which do not contain links, or for links which have not been classified, the link referral system 10 will not supplement the retrieved Web page with a link referral indicator pushbutton. As is conventional, each link in a retrieved Web page is in the form of a URL, and the link referral system 10 can identify links by identifying the URLs that are provided in the Web page.

In a third type of operation, if the user at the client computer 11 actuates a link referral indicator pushbutton that is displayed by the client computer 11 for a particular link, the client computer 11 will provide a link referral request to the link referral system 10. In response to an link referral request, the link referral system 10 will provide a list of links which are in the same class as the class for which the link referral indicator was provided. In one embodiment, the link referral system 10 provides the list of links in the form of a Web page, which will be displayed to the operator, and the operator can access the Web pages that are classified in the link referral class or classes that are associated with the actuated link referral indicator pushbutton. Since, as described above, each link referral indicator pushbutton is associated with a particular link in the originally-retrieved Web page, the Web pages that will be in the list provided when each link referral indicator pushbutton is actuated will have the same classification as the link for which the link referral indicator pushbutton was provided by the link referral system 10. It will be appreciated that the link referral system 10 can also supplement the Web pages that are retrieved for the user based on actuation of links in the link referral list in a manner corresponding to that for the original Web page as described above (the "second type of operation").

Thus, the link referral system 10 provides a mechanism for supplementing respective links that the originator of a Web page has provided, either when the Web page was originally developed or when it was updated, with other links that are related to the link, based on the classifications developed by the link referral system 10.

As shown in FIG. 1, the link referral system 10 comprises four general elements, including a front end 12, a back end 13, a spider 14, a web page analyzer 15, a section name re-write rulebase 16A, a URL re-write rulebase 16B and a link class data base 17. The front end 12 receives requests from the client computer 11 over, for example, the Internet, and provides RESP responses. Generally, requests over the Internet will be in the form of BRWSR_REQ browser requests that are generated by the client computer under control of a World Wide Web browser, such as Netscape Navigator provided by Netscape Corporation or Internet Explorer provided by Microsoft Corporation, under control of the user. For such requests, the responses will be in the form of Web pages, which are in the well-known HTML (HyperText Mark-up Language). Each BRWSR_REQ browser request will include a URL that identifies the particular Web page that is to be retrieved. If the URL identifies a Web page that is maintained by the link referral system 10, such as a Web page that contains a list of links, the front end 12 will provide a RESP response to the client computer 11 comprising the requested Web page.

On the other hand, if the URL identifies a Web page that is not maintained by the link referral system 10, the front end 12 uses the URL to, in turn, initiate a retrieval operation, also over the Internet, with the particular server computer (not shown) that maintains the Web page identified by the URL. After the front end 12 receives the Web page (as represented in FIG. 1 by the legend "Web Pages From WWW Responsive To Browser Request"), it (that is, the front end 12) will scan through the Web page to locate links in the page. As is conventional, a link in a Web page is contained within an HTML tag, for example, within an "anchor" tag, referred to as "<A HREF=HTTP://[xxxx]>" where "HTTP://[xxxx]" is the URL for a Web page and "[xxxx]" is a World Wide Web address, all in ASCII form. For each URL identified by the front end 12 in the Web page, the front end 12 will pass the URL to the back end 13. The back end 13, in turn, will indicate whether the respective URL is associated with a class and, if so, the particular class. More particularly, the back end 13 will return to the front end 12 a URL identifying a Web page, in particular the URL for a Web page maintained by the back end 13 that contains the list of links that are in the class which also contains the URL that the front end 12 provided to the back end 13. The front end 12, after receiving the URL from the back end 13, will supplement the Web page as received over the Internet with link referral indicator pushbutton information which, when the client computer 11 displays the supplemented Web page from the link referral system 10, enable the client computer 11 to display a link referral indicator pushbutton proximate the link in the Web page, thereby to generate the supplemented Web page. After generating the supplemented Web page, the front end 12 transmits it to the client computer 11.

The spider 14 and web page analyzer 15 perform a number of operations, including identification of the various classes, assignment of links in Web pages that can be retrieved over the Internet to the identified classes, and identification of duplicate links that identify the same Web page. In these operations, the spider 14 retrieves Web pages over the Internet from the various server computers (not shown) as represented by the legend "Web Pages From WWW For Analysis." As is conventional, the spider 14 uses URLs to identify Web pages to be retrieved for analysis; the spider 14 can learn of the URLs to be used in Web page retrieval in any conventional manner.

After the spider 14 receives a Web page for analysis, it caches the Web page locally within the link referral system 10 with other cached Web pages, retrieved earlier by the spider 14, for later bulk analysis by the web page analyzer 15. The Web page analyzer 15 develops the various classes to which links are to be assigned and, using the section name re-write rulebase 16A, assigns the Web pages to the respective classes. In assigning a Web pages to a class, the Web page analyzer essentially associates the Web page's URL with the respective class. In addition, the Web page analyzer 15 analyzes the retrieved Web pages to identify duplicates and, when duplicates are located, will consolidate duplicate URLs in the class assignment. To assist in the duplicate Web page consolidation operation, the Web page analyzer 15 develops the URL re-write rulebase 16B, which contains rules which are used by the Web page analyzer 15 to convert URLs to respective canonical forms.

As noted above, the Web page analyzer 15 performs three general operations, including (i) developing the various classes to which the Web pages can be assigned, (ii) assignment of the Web pages to the respective classes, and (iii) consolidation of URLs for duplicate Web pages.

The Web page analyzer 15 stores information regarding the identifications for the various classes and the Web page assignment information in the link class database 17, which will be used by the back end 13 as described below.

In developing the various classes (item (i) above), the Web page analyzer 15 makes use of the fact that Web pages are generally divided into one or more sections, in many cases the sections having subsections arranged in a hierarchy, with various ones of the sections having one or more links. Thus, an illustrative Web page, as received by the link referral system 10 in HTML format, will generally have a format along the lines of the following:

(1) <Page Title>; A title for the Web page (2) <Section Title>; A title or name for a section (3) <misc_info>; Miscellaneous information (4) <Link 1>; A link related to the section identified in line (2)

(5) <Link 2>; Another link related to the section identified in line (2)

(6) <Subsection Title>; A title or name for a subsection of the section identified in line (2)

(7) <misc_info>; Miscellaneous information for the subsection identified in line (6)

(8) <Link 3>; Another link related to the subsection identified in line (6)

(9) <Section Title>; A title or name for a second section

(10) <misc_info>; Miscellaneous information for the section identified in line (9)

(11) <Link 4>; A link related to the section identified in line (9).

(12) <etc>; Additional information for the Web page

Generally, each link will be in conventional URL format. For the illustrative Web page having the form set forth above in connection with lines (1) through (12), the Link 1 (line (4)) and Link 2 (line (5)) will both be assigned to a class that is associated with, and preliminarily identified by, the section title identified in line (2), Link 3 (line 8) will be assigned to a class that is associated with, and preliminarily identified by, a class that is identified by the subsection title identified in line (6), and Link 4 (line (11)) will be assigned to a class that is associated with, and preliminarily identified by, a class that is identified by the section title identified in line (9).

As noted above, the Web page analyzer 15, using the section name re-write rulebase 16A, will associate each link in the illustrative Web page with a class that is associated with, and preliminarily identified by, the title of the section or subsection of the illustrative Web page which contains the respective link. It will be appreciated that different Web pages which the Web page analyzer 15 analyzes can use different names for generally similar classifications; illustratively, diverse Web pages may use names such as "motion pictures," "movies" and "films" all to identify what is generally considered the same subject matter, and which may include, in sections or subsections with the respective titles, the links to the same set or overlapping subsets of Web pages. Accordingly, the Web page analyzer 15, assigns each link to a particular class associated with the section and/or subsection which contains the link, using rules in the section name re-write rulebase 16A, to convert section names into their canonical forms. In one embodiment, the rules in the section name re-write rulebase 1 6A are generated manually. The section name re-write rulebase 16A contains rules for modifying section names to respective canonical forms by deleting words and phrases out of the section name, replacing phrases with other canonical forms, changing capitalization, and so forth. For example, rules in the section name re-write rulebase 16A in one embodiment convert a section name, such as "Favorite film-related links," to a canonical form, such "Movies" as follows:

"Favorite film-related links"; Original

→"Favorite Film-Related Links"; Canonicalize capitalization

→"Film-Related Links"; Delete leading "Favorite"

→"Film-Related"; Delete trailing "Links"

→"Film"; Delete trailing "-Related"

→"Movie" or "Movies"; Replace "Film" with "Movie" and choose between singular and plural forms of "Movie"

After the Web page analyzer 15 applies the section name re-write rulebase 16A to a particular section name, the resulting section name is compared to a list of predetermined section names. If the resulting section name, generated after applying the section name re-write rulebase 16A is one of the predetermined section names, then information that the links within the particular section of the Web page occurred within that particular section is saved. If the canonical form generated by the Web page analyzer 15 is empty, or if it is not on the list, then the Web page analyzer 15 saves an indication that the links occurred within an anonymous section. It will be appreciated that the list of named sections and the links contained therein can be used to develop named link classifications, and that all sections, both named and anonymous, can be used to develop "anonymous" classifications of related links so that the link referral system 10 can give related links to a particular link even when it doesn't have a "named" classification for that link.

Since, as described above, a single Web page can be identified by different links, it will be desirable to determine when multiple links, which can be associated with the same and/or multiple classes, in fact identify the same Web page. To accomplish that operation, the Web page analyzer 15 converts each link to the canonical form, using URL "re-write rules" that it develops and stores in the URL re-write rulebase 16B. The Web page analyzer 15 generates the re-write rules as it analyzes Web pages received from the spider 14. As described above, generally, a URL for the World Wide Web is in the form of "HTTP://[xxxx]" where "[xxxx]" is a World Wide Web address. A World Wide Web address, in turn, is in the form of a series of alphanumeric characters separated by separators in the form of ASCII periods ("."). The URL may comprise one such series, or a plurality of series concatenated and divided by ASCII slashes ("/"). Accordingly, a URL is illustratively in the form of "HTTP://first.series/*/last.series", where "*" represents any number of intermediate series. The URL essentially defines a file in a directory maintained by a server computer that is identified by the "first.portion", which file contains the Web page identified by the URL. An illustrative URL is "HTTP://www.netscape.com/index.html", where "www.netscape.com" identifies a server computer maintained by Netscape Corporation ("www" identifies the World Wide Web and "netscape" identifies Netscape Corporation), and "index.html" is the name of a file in a root web page directory of the server computer.

In generating the URL re-write rules, the Web page analyzer 15 generally processes the URL from the outward most portions of the respective World Wide Web addresses, eliminating portions of the respective series, as defined by the separators, to determine candidate URLS. For the illustrative URL above, "HTTP://www.netscape.com/index.html", candidate URLs will generally include, for example, eliminating portions from the beginning of the World Wide Web address:

(1) "HTTP://netscape.com/index.html"; eliminating "www" and, beginning from the end of the World Wide Web address:

(2) "HTTP://www.netscape.com/index"; eliminating ".html"

(3) "HTTP://www.netscape.com/"; eliminating "index"

(4) "HTTP://www.netscape.com; eliminating"/" to generate candidate URLs. In addition, the Web page analyzer can process each candidate URL generated by eliminating portions from the beginning of the World Wide Web address (such as candidate URL (1)) to eliminate portions from the end of the World Wide Web address, and each candidate URL generated by eliminating portions from the end of the World Wide Web address (such as candidate URLs (2), (3) and (4)) to eliminate portions from the beginning of the World Wide Web address.

More specifically, the Web page analyzer 15 generates the URL re-write rules for the URL re-write rulebase 16B as follows 1) Initially, the Web page analyzer 15 compares each Web page in the cache with every other page. When two pages match, the URLs corresponding to pages are stored in an entry in a matching page list (not separately shown).

2). For each pair of URLs in the matching page list:

2a). the Web page analyzer 15 initially applies all previously-established URL re-write rules, if any, in the URL re-write rulebase 16B to both of the URLs in an entry in the matching page list.

2b). If the Web page analyzer 15 determines that the URLs the entry are identical to each other after all the rewrite rules have been applied, no new rule is added, and so the Web page analyzer 15 returns to at step 2a.

2c). If the Web page analyzer 15 determines in step 2b that the URLs in the entry are not identical to each other, it (that is, the Web page analyzer 15) find the shortest substitution rule that textually rewrites the longer URL into the shorter URL. For example, the shortest rule to change http://www.netscape.com/index.html" to "HTTP://netscape.com/index.html" is to replace "www." with "" (that is, delete "www."). This rule is now a "candidate" rewrite rule.

2d). Thereafter, the Web page analyzer 15 scores the candidate re-write rule as follows:

2d1). For each URL, the Web page analyzer 15 applies the candidate re-write rule to the URL. If the result is a URL of an actual Web page (illustratively, a Web page in the cache) then the Web page analyzer 15 checks the matching page list to see if the URLs match.

2d2). If the Web page analyzer 15 determines in step 2d1 that the URLs match, the Web page analyzer 15 increments a number of "hits" counter (not separately shown) for the candidate re-write rule; but 2d3). If the Web page analyzer 15 determines that the URLs do not match, the Web page analyzer 15 increments a number of "misses" counter (not separately shown)for the candidate rewrite rule.

2d4). After applying the candidate re-write rule to all of the URLs in the matching page list, the Web page analyzer 15 generates the score for the candidate rewrite rule as the ratio of misses to hits.

2e. After generating the score, the Web page analyzer 15 will store the candidate re-write rule in the URL re-write rulebase 16B if the score is below a predetermined threshold value. A low score indicates that there are a large number of hits relative to the number of misses, whereas a high score indicates there are a lot of misses relative to the number of hits. In that case, the candidate re-write rule is considered an appropriate URL re-write rule,.

2f. On the other hand, if the Web page analyzer 15 determines that the score generated in step 2d4 is above the predetermined threshold value, the candidate re-write rule is considered to not be an appropriate URL re-write rule. In that case, the Web page analyzer 15 makes the candidate rule more specific by adding additional portions to it. For example, in the example above, the Web page analyzer 15 may change the candidate rule to "substitute "/netscape." for "/www.netscape.""

Thereafter, the Web page analyzer 15 returns to step 2c and repeats the operations described above until an appropriate rule is found and loaded into the URL re-write rulebase 16B, or no additional portions can be added to the candidate re-write rule.

As noted above, when the front end 12 receives a Web page from a server computer (not shown) in response to a request from a client computer 11, it (that is, the front end 12) will, for each such link in the Web page associated with a class maintained by the link class database, supplement the respective link indicator in the Web page with a respective link referral indicator, and provide the supplemented Web pages to the requesting client computer 11 for display to the operator in a conventional manner. To accomplish that, the front end 12 will, for each link in the retrieved Web page, submit an inquiry to the back end 13 as to whether the link is associated with a class. In response to the inquiry, the back end 13 references the link class database 17 to determine whether the link has been associated with a class, and, if so, will provide a positive response to the front end 12 that also serves to identify the class with which the link has been associated. The identification is in the form of a URL to a Web page that the link class database 17 maintains for the class. The front end 12 will receive the response and supplement the Web page using the URL provided by the back end 13, as described above, so as to enable the client computer 11 to display the pushbutton for the link referral indicator. In addition, the front end 12 will transmit the supplemented Web page to the client computer 11 for display.

As further noted above, if the user operating the client computer 11 activates the link referral indicator pushbutton, the client computer will transmit a browser request BRWSR_REQ to the link referral system 10. The browser request BRWSR_REQ will include the URL that is associated with the link referral indicator pushbutton, which, it will be appreciated, is a URL that identifies a Web page that is maintained by the link referral system 10 itself. When the link referral system 10, in particular, the front end 12, receives the browser request BRWSR_REQ, instead of transmitting a request over the Internet to initiate a retrieval of the Web page from another server computer, it will provide the request to the back end 13, including the URL provided in the browser request BRWSR_REQ. In response to the request from the front end 12, the back end 13 will retrieve the Web page identified by the URL and provide it to the front end 12, which, in turn, will provide the Web page to the client computer 11 for display to the operator. As noted above, the Web page provided by the front end 12 essentially enables the client computer to display the list of links, including respective URLS, that have been associated with the class that is, in turn, associated with the URL received in the browser request BRWSR_REQ received from the client computer 11. Accordingly, the user can, by actuating respective ones of the links, enable the client computer 11 to generate one or more subsequent browser requests BRWSR_REQ including URLs for the respective links. The link referral system 10 will process the subsequent browser requests in the same manner as with an initial request, as described above, so that (i) for those links that relate to URLs for Web pages that are maintained by server computers, the front end 12 will retrieve the Web pages and, when the Web pages are received, generate supplemented Web pages as described above for transfer to the client computer 11, and (ii) for those links that relate to URLs for Web pages that are maintained by the link referral system 10, in particular those that contain lists of links for particular classes, the front end 12 will obtain the Web page from the back end 13 to provide to the client computer.

Figure 2:
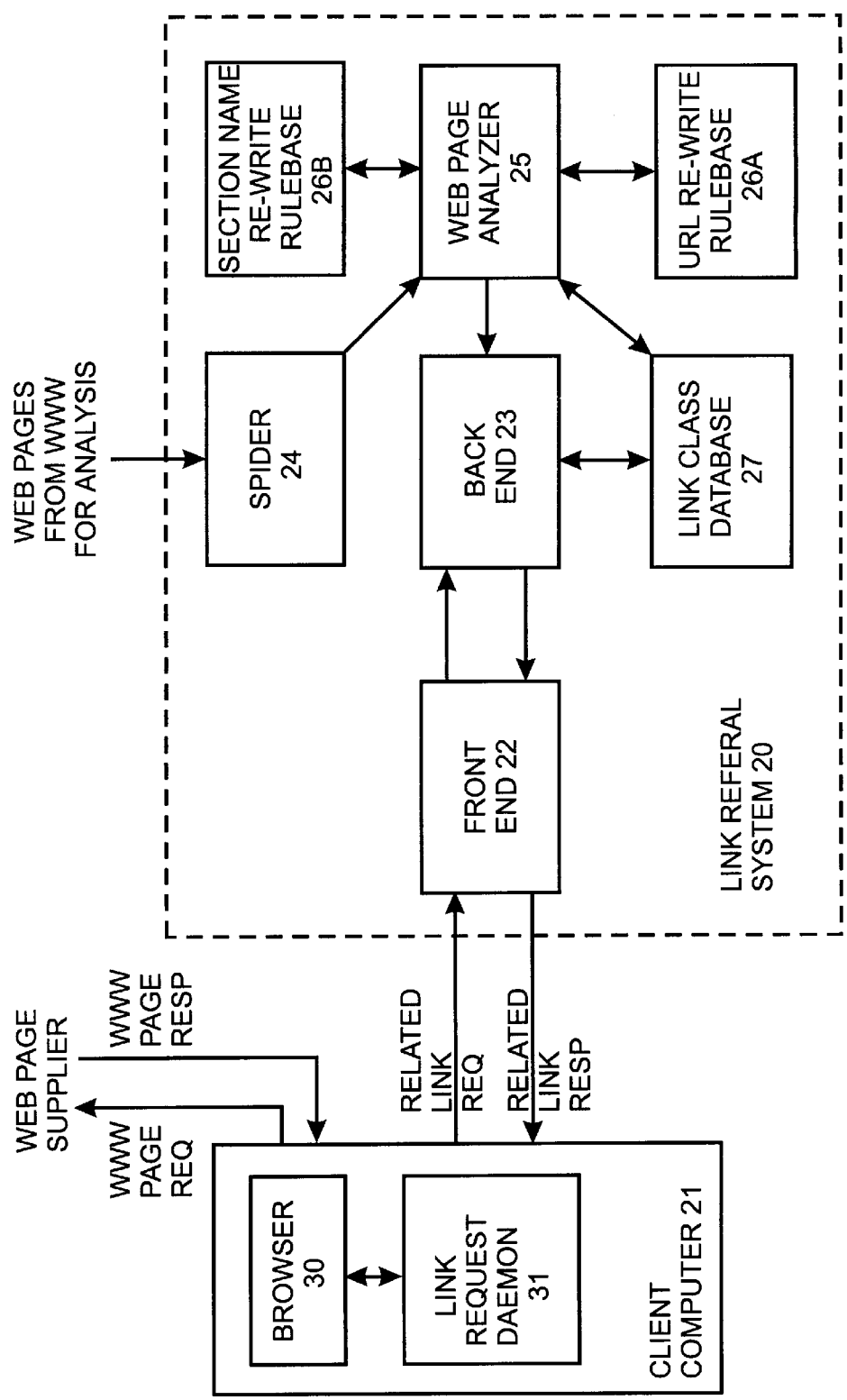
FIG. 2 is a functional block diagram of a second embodiment of a World Wide Web link referral system constructed in accordance with the invention.

In the embodiment depicted in FIG. 1, Web page requests are directed by a client computer 11 to the link referral system 10, and the link referral system retrieves the Web pages and generates the supplemented Web pages for provision to the client computer 11. It will be appreciated that, in that arrangement the link referral system 10 can create a bottleneck such that, if the rate at which the link referral system 10 receives Web page requests is too large, the response time by the link referral system can increase undesirably. FIG. 2 depicts an alternate embodiment of the link referral system, identified by reference numeral 20, in which the client computer, identified by reference numeral 21, issues Web page requests to the Web page proprietors over the Internet in a conventional manner, and receives and displays the Web pages also in a conventional manner. The link referral system 20 includes a back end 23, spider 24, Web page analyzer 25, section name re-write rule-base 26A, URL re-write rulebase 26B and link class database 27, which are similar to respective elements 13 through 17 described above in connection with FIG. 1. In particular, these elements 23 through 27 generate link classification information for Web page links in the same manner as described above in connection with elements 13 through 17.

As shown in FIG. 2, the client computer 21 includes both a browser 30 and a link request daemon 31. The browser 30 issues Web page requests, represented in FIG. 2 by "WWW_PAGE_REQ," to the Web page proprietors to initiate a retrieval of the Web pages therefrom, and receives the Web pages, represented in FIG. 2 by "WWW_PAGE_RESP," for display to the operator. The link request daemon 31, either automatically or in response to a request from the operator, initiates a retrieval of related link information from the link referral system 20 for some or a selected subset (as may be determined by the operator) of the links in the displayed Web page. In that operation, the link request daemon 31 will issue a related link request over the Internet, represented in FIG. 2 by "RELATED_LINK_REQ," including the identification of one or more links, which will be received by the front end 22. The front end 22, in turn, will receive the related link request, enable the back end 23 to retrieve the related link information for respective links identified in the request, and provide the related link information, represented in FIG. 2 by "RELATED_LINK_RESP," to the link request daemon 31. The link request daemon, in turn, will display the related link information to the operator, in either a window of the browser 30 or in a separate window on the client computer 21. The operator can initiate a retrieval of other Web pages by clicking on links identified in the displayed related link information.

Since the client computer 21 does not need to retrieve Web pages through the link referral system 20 to obtain the related link information, the Web page retrieval may be somewhat more rapid than in connection with the embodiment described above in connection with FIG. 1. It will be appreciated that the link referral system 10 and link referral system 20 are not mutually exclusive; that is, a particular link referral system can include the capabilities of both systems, with a single front end being capable of responding to Web page requests from a client for Web pages maintained by other proprietors by retrieving the Web pages therefrom and supplementing them as described above in connection with FIG. 1, and in addition responding to related link requests from a client for providing related link information as described above in connection with FIG. 2.

In another aspect, which can be used both in connection with link referral system 10 and link referral system 20, and separate and apart from both systems 10 and 20, the client, using a browser, can request from the link referral system Web pages that identify the classifications that it (that is, the respective link referral system 10, 20) has developed. The operator, by clicking on a respective classification, can obtain a Web page that identifies the links that the link referral system has classified therein, and, by clicking on the links, can access the Web pages in a conventional manner.

The invention provides a number of advantages. In particular, the invention provides a link referral system 10 that enables the supplementation of a Web page with information related to links to other Web pages that relate to subject matter for which there are links in the earlier-received Web page. The invention provides an automated mechanism for identifying Web pages and their associated links and for assigning the Web pages to particular subject-matter classification. In addition, the invention allows for supplementation of a Web page with information relating to additional links of which the Web page developer was not aware when the Web page was originally developed or last updated, as well as links to Web pages which were not available when the Web page was last updated.

It will be appreciated that a number of modifications may be made to the invention. For example, although the invention has been described in connection with the Internet and, in particular, the World Wide Web, the invention will find utility in connection with a any network or other interconnection using the client/server paradigm. In addition, although the invention has been described in connection with Web pages using HTML format, it will be appreciated that the invention will be useful in connection with units of information in any format, the primary requisite being the presence of links to other such units in the information. Further, although the Web page analyzer 15 has been described as utilizing a particular strategy for assigning links to particular classes (using Web page section and subsection titles) and for eliminating duplicate links (using the so-called link re-write rules described above), it will be appreciated that other class assignment and (if necessary) duplicate link elimination strategies can be used.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A link referral system for providing related link information to a client computer comprising:
   A. a URL classifier configured to generate, for each of a plurality of URL's for respective Web pages, a URL classification, thereby to classify said URLs into a plurality of classes; and
   B. an interface configured to provide said URL classification information to a client computer.

2. A link referral system as defined in claim 1 in which said URL classifier comprises:
   A. a Web page retrieval module configured to retrieve Web pages, and
   B. a Web page analyzer module configured to analyze Web pages retrieved by said Web page retrieval module and generate said URL classification information in relation thereto.

3. A link referral system as defined in claim 2 in which said Web page retrieval module is configured to retrieve said Web pages over a network.

4. A link referral system as defined in claim 2 in which at least one Web page retrieved by said Web page retrieval module has at least one section having associated therewith at least one URL and section name, said Web page analyzer module being configured to generate, for said at least one URL, URL classification information associating said at least one URL with a class related to the section name.

5. A link referral system as defined in claim 4 in which a plurality of Web pages retrieved by said Web page retrieval module have respective sections each identified by a section name and each having at least one URL, said Web page analyzer module being configured to generate, for respective URL's on said Web pages, URL classification information associating said URL's with respective classes relating to the respective section names.

6. A link referral system as defined in claim 5 further including a section name re-write database associating at least one section name with a class identifier identifying at least one class, the Web page analyzer module being configured to use said section name re-write database to identify, for at least one URL, URL classification information based on the class identifier associated with the section name associated with the section containing said at least one URL.

7. A link referral system as defined in claim 2 in which said Web page analyzer is configured to generate, for at least one URL, a canonical form URL and generate the URL classification information in connection therewith.

8. A link referral system as defined in claim 7 further including a URL re-write rulebase including at least one URL re-write rule, the Web page analyzer being configured to use the at least one URL re-write rule in connection with generating the canonical form URL.

9. A link referral system as defined in claim 1 in which
   A. said URL classifier is configured to store the URL classification information in a link classification database, the URL classification information comprising URL's associated with a class identifier, and
   B. the interface is configured to provide the URL classification information in response to a request from said client computer, the request including a request URL, the interface being configured to provide to said client computer URL's associated with the class identifier which, in turn, is associated with the class identifier which the request URL is associated.

* * * * *